(12) United States Patent
Jin et al.

(10) Patent No.: US 9,948,919 B2
(45) Date of Patent: Apr. 17, 2018

(54) STEREOSCOPIC 3D CAMERA FOR VIRTUAL REALITY EXPERIENCE

(71) Applicant: Lucid VR, Inc., Sunnyvale, CA (US)

(72) Inventors: Han Xiong Jin, Sunnyvale, CA (US); Adam Rowell, Sunnyvale, CA (US)

(73) Assignee: LUCID VR, INC., Santa Clara, CA (US)

( * ) Notice: Subject to any disclaimer, the term of this patent is extended or adjusted under 35 U.S.C. 154(b) by 0 days.

(21) Appl. No.: 15/179,056

(22) Filed: Jun. 10, 2016

(65) Prior Publication Data
US 2016/0323561 A1 Nov. 3, 2016

Related U.S. Application Data

(63) Continuation of application No. 15/143,443, filed on Apr. 29, 2016.

(60) Provisional application No. 62/154,703, filed on Apr. 29, 2015.

(51) Int. Cl.
| | |
|---|---|
| H04N 13/02 | (2006.01) |
| H04N 13/00 | (2018.01) |
| H04N 5/232 | (2006.01) |
| H04N 9/87 | (2006.01) |
| H04N 5/77 | (2006.01) |
| H04N 5/907 | (2006.01) |

(Continued)

(52) U.S. Cl.
CPC .......... *H04N 13/0246* (2013.01); *G06T 7/85* (2017.01); *H04N 5/23238* (2013.01); *H04N 5/23267* (2013.01); *H04N 5/772* (2013.01); *H04N 5/907* (2013.01); *H04N 9/8205* (2013.01); *H04N 9/8227* (2013.01); *H04N 9/8715* (2013.01); *H04N 13/0014* (2013.01); *H04N 13/0055* (2013.01); *H04N 13/0066* (2013.01); *H04N 13/0239* (2013.01); *H04N 13/0296* (2013.01)

(58) Field of Classification Search
CPC ..................... H04N 13/0282; H04N 13/0278
See application file for complete search history.

(56) References Cited

U.S. PATENT DOCUMENTS

| | | | | |
|---|---|---|---|---|
| 2006/0028489 | A1* | 2/2006 | Uyttendaele | .......... G06T 15/205 345/646 |
| 2006/0093239 | A1* | 5/2006 | Kakinami | ............. G06T 3/0018 382/275 |

(Continued)

OTHER PUBLICATIONS

Non-Final Office Action dated Jan. 26, 2017 in U.S. Appl. No. 15/143,443 of Jin, H. et al. filed Apr. 29, 2016.

*Primary Examiner* — Mehrdad Dastouri
*Assistant Examiner* — Rowina Cattungal
(74) *Attorney, Agent, or Firm* — Perkins Coie LLP

(57) ABSTRACT

Embodiments are disclosed for embedding calibration metadata for a stereoscopic video capturing device. The device captures a sequence of stereoscopic images by a plurality of image sensors and combines the captured sequence of stereoscopic images into a stereoscopic video sequence. The device further embeds calibration information into the stereoscopic video sequence in a real time as the sequence of stereoscopic images is being recorded. The calibration information can be used to correct distortion caused by hardware variances of individual video capturing devices. The corrected stereoscopic videos can be used to provide a virtual reality (VR) experience by immersing a user in a simulated environment.

17 Claims, 6 Drawing Sheets

(51) Int. Cl.
*H04N 9/82* (2006.01)
*G06T 7/80* (2017.01)

(56) References Cited

U.S. PATENT DOCUMENTS

| | | | |
|---|---|---|---|
| 2012/0075435 A1* | 3/2012 | Hovanky | H04N 13/02 |
| | | | 348/51 |
| 2013/0120224 A1 | 5/2013 | Cajigas et al. | |
| 2013/0124471 A1* | 5/2013 | Chen | H04N 5/23238 |
| | | | 707/624 |
| 2013/0210523 A1* | 8/2013 | Arumugam | G07F 17/3255 |
| | | | 463/31 |
| 2015/0049946 A1 | 2/2015 | Madineni et al. | |
| 2015/0062292 A1* | 3/2015 | Kweon | H04N 5/23238 |
| | | | 348/37 |
| 2015/0172544 A1* | 6/2015 | Deng | G06T 9/001 |
| | | | 348/36 |
| 2015/0254818 A1* | 9/2015 | Li | G06T 5/006 |
| | | | 382/275 |
| 2016/0065947 A1* | 3/2016 | Cole | H04N 13/0014 |
| | | | 348/43 |
| 2016/0255327 A1 | 9/2016 | Cole et al. | |
| 2016/0323560 A1 | 11/2016 | Jin et al. | |

\* cited by examiner

STEREOSCOPIC 3D CAMERA FOR VIRTUAL REALITY EXPERIENCE

CROSS REFERENCE TO RELATED APPLICATIONS

This application is a continuation of U.S. Utility application Ser. No. 15/143,443 entitled "STEREOSCOPIC 3D CAMERA FOR VIRTUAL REALITY EXPERIENCE," filed Apr. 29, 2016, which claims the benefit of U.S. Provisional Application No. 62/154,703 entitled "STEREOSCOPIC CAMERA CAPTURING 180-DEGREE 3D IMAGES AND VIDEOS," filed Apr. 29, 2015; all of which are incorporated by reference herein in their entirety.

BACKGROUND

Virtual reality (VR) is a computer technology that simulates an environment. Virtual reality can replicates different sensory experience, e.g., sight, touch, hearing or smell in a way that allows a user to interact with the simulated environment. In particular, some virtual reality technologies focus on visual experience. The visual experience is displayed on a computer screen or with a virtual reality headset (also referred to as head mounted display or HMD). The virtual reality technology simulates the immersive environment in a way close to the real world experience in order to replicate a lifelike experience.

DETAILED DESCRIPTION

Figure 1:
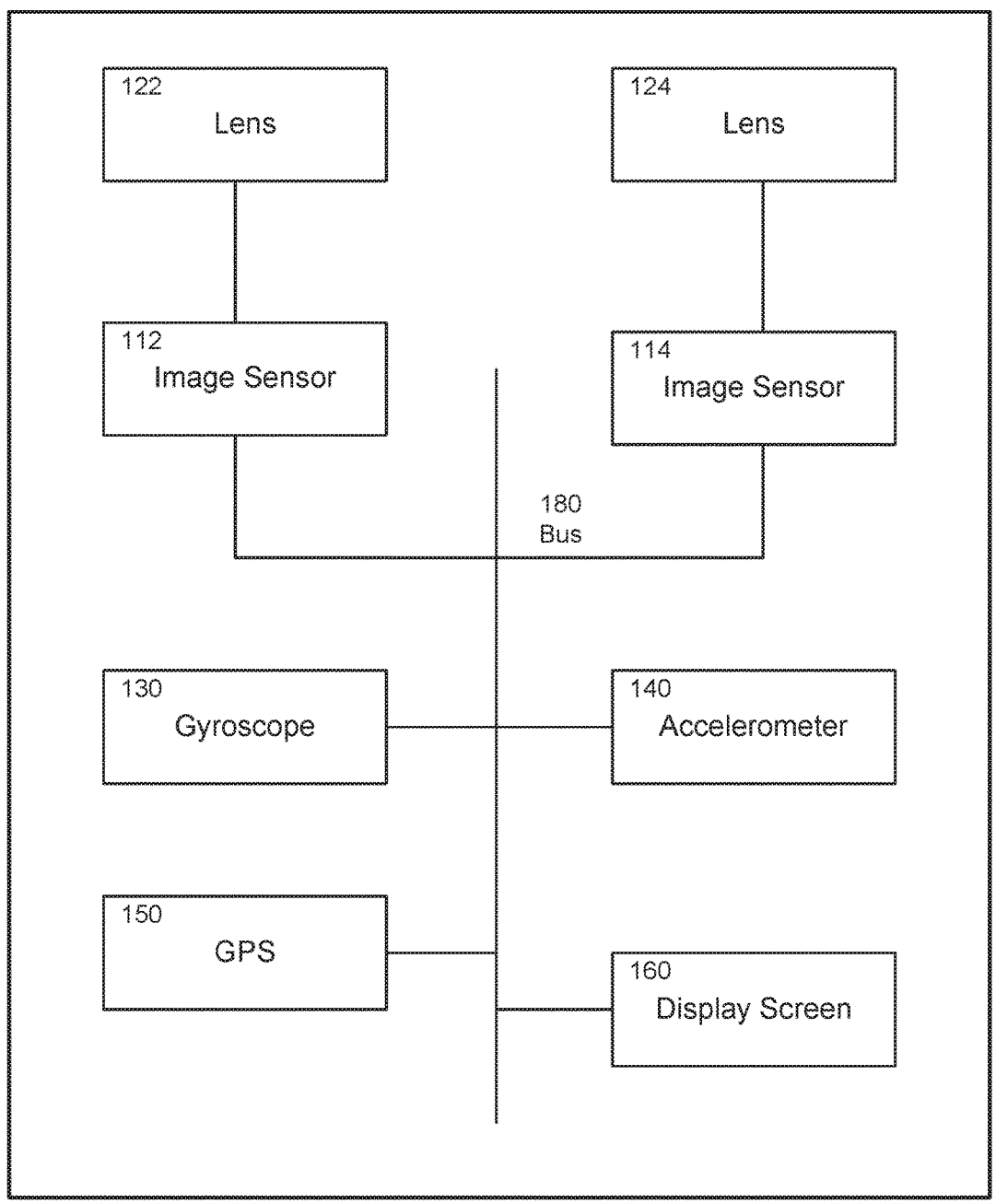
FIG. 1 is a block diagram showing components of a stereoscopic 3D video camera that can record stereoscopic videos and embed stereoscopic calibration metadata.

FIG. 1 is a block diagram showing components of a stereoscopic 3D video camera device that can record three-dimensional (3D) stereoscopic videos and embed 3D stereoscopic calibration metadata. The stereoscopic 3D video camera device (also referred to as stereoscopic device) captures 3D images and/or videos with a wide field of view (FOV). The disclosed 3D VR technology provides a virtual reality (VR) experience by immersing a user in a simulated environment using the captured 3D images or videos. The playback device for simulating the immersive 3D VR environment can be either the stereoscopic 3D video camera itself, or a separate display device or HMD.

In some embodiments, the stereoscopic device includes two wide-angle lenses (e.g., fish-eye lenses) to capture 3d images and videos with a wide field of view. For example, the field of view can be, e.g., 180 degrees. The two wide-angle lenses can be spaced apart at a distance similar to a typical distance between the human eyes.

The stereoscopic device can further include two digital image sensors that capture images based on light transmitted through the two wide-angle lenses. Each image sensor is mounted behind one of the wide-angle lenses. The digital image sensors can be, e.g., charge-coupled devices (CCDs) or complementary metal-oxide-semiconductor (CMOS) devices that convert the light signals into digital data. The wide-angle lenses and the digital image sensors can simultaneously capture images or video streams from two different perspectives, each with a wide field of view (e.g., 180 degrees).

As shown in FIG. 1, the stereoscopic 3D video camera device 100 includes two or more image sensors 112 and 114 fitted with one lens (122 and 124) per sensor. The lens 122 and image sensor 112 can capture images or videos for a left eye channel; while the lens 124 and image sensor 114 can capture images or videos for a right eye channel. During a playback stage, the images or videos for the left eye channel will be played back to be perceived by a left eye of a user; while the images or videos for the right eye channel will be played back to be perceived by a right eye of a user. Because of the left and right channels are captured from two different perspectives, the user is able to experience the 3D effect using his eyes.

Each of the image sensors 112, 114 and lenses 122, 124 have associated parameters, such as the sensor size and resolution, the lens focal lengths, and lens distortion parameters. The parameters of each image sensor and lens may be unique for each image sensor or lens, and are often determined through a stereoscopic camera calibration process.

During the video capturing process, the image sensors (e.g., 112, 114) record video frames, and the stereoscopic camera combines the frames from the individual image sensors into a composite video file. In some embodiments, the composite video file includes two channels of video streams, for left and right eyes respectively. The video frames may be processed prior to being encoded into the video file, with additional image processing parameters describing the processing.

Additionally, the device 100 may have additional sensors, such as a gyroscope 130, accelerometer 140, or GPS device 150 to record information related to the movement or position of the stereoscopic device 100. The electrical components of the device 100 are interconnected by a bus 190.

The stereoscopic device can further include a storage device for storing the digital data of the captured images and videos (also referred to image data and video data). For example, the storage device can be, e.g., a flash memory, a solid-state drive (SSD) or a magnetic storage device.

The stereoscopic device can include one or more data interfaces for communicating with external devices. For example, the stereoscopic device can include a USB interface that is capable of connecting to an external device (e.g., a laptop, an external hard drive, a tablet, a smart phone) for transmitting the video data or video data to the external device.

In some embodiments, the stereoscopic device itself can further function as a virtual reality headset. The device includes a display screen (e.g., display screen 160) for playing back the captured 3D images or 3D videos. The device can utilize a motion sensor (e.g., accelerometer 140, or an inertial measurement unit, as referred to as IMU) for determining head position and orientation of a user who wears the stereoscopic device as a virtual reality headset. The shape of the stereoscopic device is designed to be fit into a mounting device to form a head mount device. The mounting device is for attaching the stereoscopic device on the head of the user such that the user's eyes are in front of the left and right portions of the display screen respectively.

The device simultaneously records two videos from two different perspectives using the two digital image sensors. Because of the wide-angle lenses 112 and 124, the videos are captured with a wide field of views (FOVs), e.g., 180 degrees. Such a field of view is wider than the field of view of human eyes. For example, humans' binocular visions typically have a field of view of 114 degrees (horizontally). During playing back as a virtual reality headset, the stereoscopic device determines the head position and orientation and only plays back a cropped portion of the captured 3D images or videos. The sizes and locations of the cropping windows depend on the detected head position and orientation, as well as the human field of view.

The device plays back the cropped 3D images or videos with a narrower field of view on the left and right portions of the display screen. The left eye of the user is in front of the left portion of the display screen, and views the left channel of the cropped 3D images or videos. Similarly, the right eye of the user is in front of the right portion of the display, and views the right channel of the cropped 3D images or videos. Because the left and right channels of the 3D images or videos were captured at two different perspectives, the user experiences a stereoscopic 3D effect.

When the user moves the head to a different position or orientation, the motion sensor detects the movement. Based on the new head position or orientation, the device determines new positions (or new sizes as well) of the cropping windows and generates in real time the cropped 3D images or videos. Therefore, the field of view experienced by the user eyes changes correspondingly as the user moves the head. Thus, the user is immersed in a virtual reality created based on the 3D images or videos.

In this way, the user can move the head to look freely in different directions at different parts of the 3D image or 3D video within the wide field of view (e.g. 180 degrees, or even 360 degrees). Because the field of view of the captured 3D image or 3D video (prior to cropping) is larger than the field of view of the human vision, the user experiences a sense of presence in a virtual environment created based on the captured 3D image or 3D video. In other words, the 3D image or video provides the user a realistic illusion of being immersed into the image or video.

In some embodiments, the stereoscopic device does not need to combine the left and right channels of the 3D image or 3D video into a single channel, since the two channels are shown separately to the left and right eyes of the user. In some other embodiments, the left and right channels of the 3D image or 3D video can be combined together to form a single feed of image or video such that there is no visible seam between the left and right portions of the display screen when the device plays back the 3D image or 3D video.

In some embodiments, multiple stereoscopic devices can be used together to capture the 3D image or 3D video in a super wide field of view (e.g., 360 degrees). For example, three stereoscopic devices can be mounted on a 360 rig mount such the three stereoscopic devices are facing three different directions. The 3D images or 3D videos captured by the stereoscopic devices can be stitched together to create a 360-degree virtual reality experience. For example, when a user moves the head at any orientation with the 360 degrees, the device in real time plays back a cropped portion of the 360-degree stitched 3D videos based on the head orientation and human vision field of view. Therefore, the user can experience a sense of presence in a 360-degree virtual environment based on the 360-degree 3D image or 3D video captured simultaneously by the three stereoscopic devices.

Figure 2:
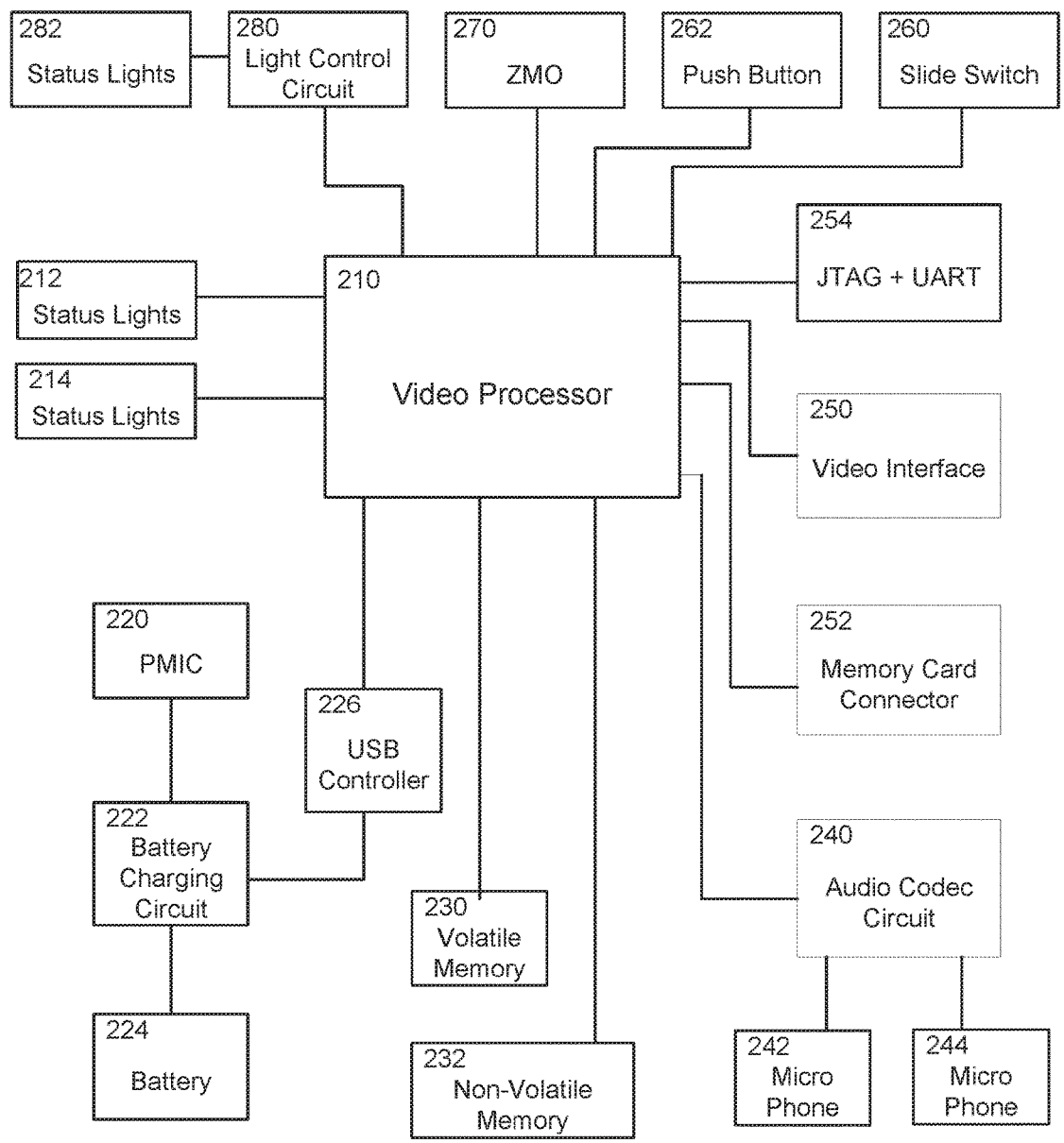
FIG. 2 is a block diagram showing various components of a sample stereoscopic device.

In addition to the lens and image sensors, the stereoscopic device can include various types of components. FIG. 2 is a block diagram showing various components of a sample stereoscopic device. The stereoscopic device 200 includes a video processor 210 for processing various data collected by different components. The video processor 210 receives captured image data from image sensors 212 and 214.

A power management integrated circuit (PMIC) 220 is responsible for controlling a battery charging circuit 222 to charge a battery 224. The battery 224 supplied electrical energy for running the stereoscopic device 200. The video processor 210 can be connected to an external device via a USB controller 226. In some embodiments, the battery charging circuit 222 receives external electrical energy via the USB controller 226 for charging the battery 224.

The stereoscopic device 200 includes a volatile memory 230 (e.g. double data rate memory or 4R memory) and a non-volatile memory 232 (e.g., embedded MMC or eMMC, solid-state drive or SSD, etc.). The video processor 210 can also control an audio codec circuit 240, which collects audio signals from microphone 242 and microphone 244 for stereo sound recording.

The stereoscopic device 200 can include additional components to communicate with external devices. For example, the video processor 210 can be connected to a video interface 250 (e.g., high-definition multimedia interface or HDMI) for sending video signals to an external device. The device 200 can further include an interface 254 conforming to Joint Test Action Group (JTAG) standard and Universal Asynchronous Receiver/Transmitter (UART) standard.

The stereoscopic device 200 can include a memory card connector 252 to accommodate a memory card for providing additional storage space. The device 200 can further include a slide switch 260 and a push button 262 for operating the device 200. For example, a user may turn on or off the device 200 by pressing the push button 262. The user may switch between different modes (e.g., image capturing, video capturing, 3D capturing) using the slide switch 260.

The device 200 can include an inertial measurement unit (IMU) 270 for detecting orientation and/or motion of the device 200. The video processor 210 can further control a light control circuit 280 for controlling the status lights 282. The status lights 282 can include, e.g., multiple light-emitting diodes (LEDs) in different colors for showing various status of the device 200.

Stereoscopic 3D Calibration for VR

Other than the different perspectives, human eyes are very sensitive to any differences between the left and right eye visions. When there is a noticeable difference in distortions between the left and right channels of the 3D video, the stereoscopic 3D effect experienced by the user is significantly suppressed. During the manufacturing processes of the wide-angle lenses, digital image sensors, and the stereoscopic device, various types of manufacturing variances can be introduced.

As shown in FIG. 1, the stereoscopic 3D camera device records stereoscopic image frames from two different camera modules, each of which includes a fisheye lens and an image sensor. The stereoscopic camera device can store calibration metadata related to the lenses and images sensors of the camera device for correcting distortion caused by manufacturing variances of the lenses and the image sensors.

Figure 3:
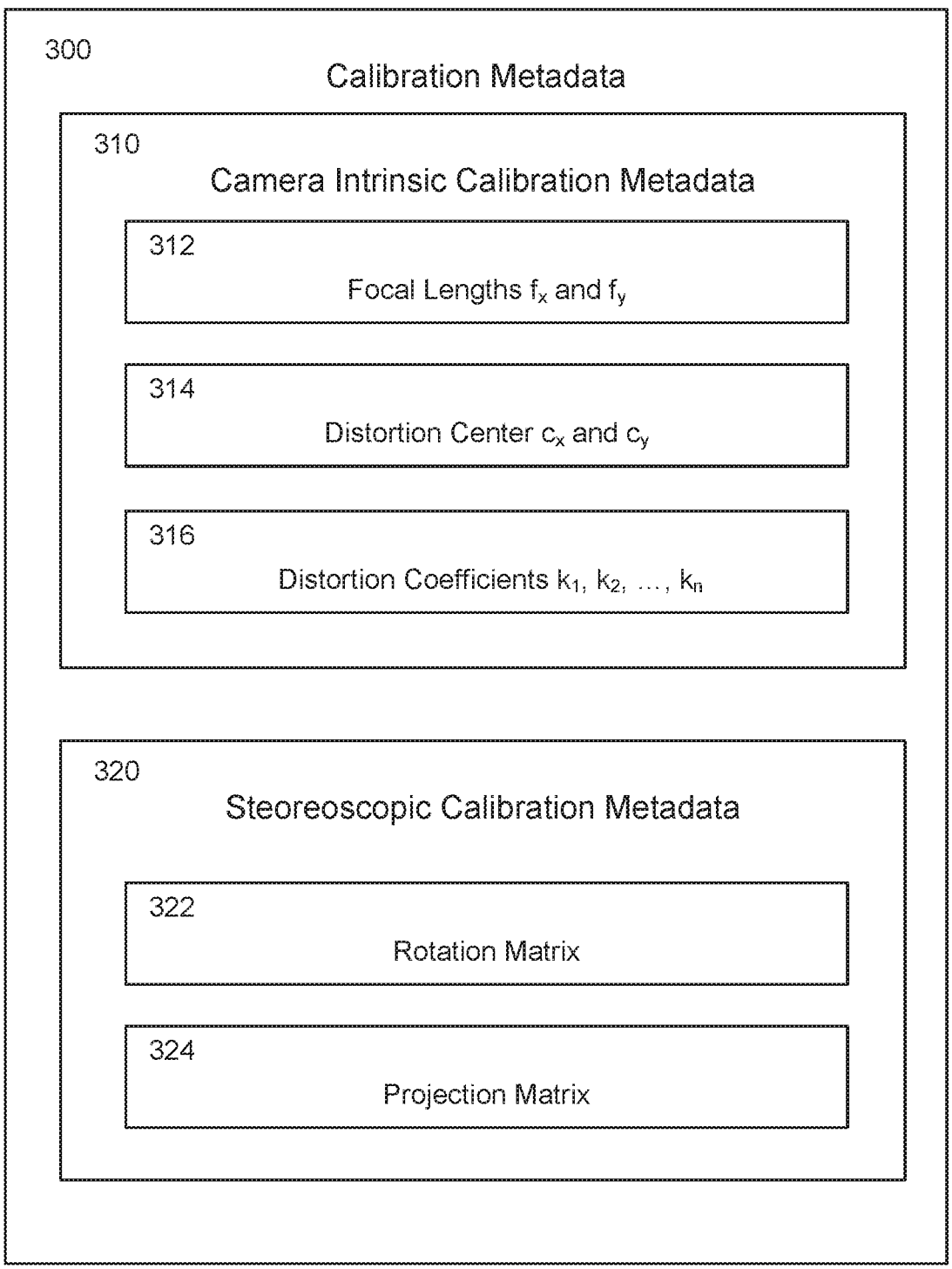
FIG. 3 shows a sample set of calibration metadata including various types of information for a sample stereoscopic device.

FIG. 3 shows a sample set of calibration metadata including various types of information for a sample stereoscopic device. At manufacture time, two types of calibration metadata 300 (also referred to as calibration information) are determined for each stereoscopic 3D camera device, in order to properly render the final 3D images or videos perceived by the users. At manufacture time, each camera module is calibrated to determine its camera intrinsic calibration metadata 310. Furthermore, stereoscopic calibration metadata 320, which relates to the relevant relationship between two camera modules, is also determined.

In some embodiments, the camera intrinsic calibration metadata 310 for a camera module (which includes a fisheye lens and an image sensor) can include parameters $f_x$, $f_y$, $c_x$, $c_y$, and $k_1, k_2, \ldots, k_n$. Each of the camera modules has its own unique set of camera intrinsic calibration metadata.

The $f_x$ and $f_y$ parameters 312 describe the focal lengths of the fisheye lens in the x and y directions that are perpendicular to each other. The focal lengths are the distances over which initially collimated light rays are brought to a focus, and measures of how strongly the fisheye lens converges or diverges lights. A fisheye lens with a shorter focal length can bend the light rays more sharply. Since the fisheye lens may not be perfectly circular, the fisheye lens may distort or bend the light in slightly different ways in the x direction versus the y direction. Thus, the focal length at the x direction $f_x$ can be different from the focal length at the y direction $f_y$.

The $c_x$ and $c_y$ parameters 314 describe the distortion center of the fisheye projection in the image frame captured by the fisheye lens. Since the fisheye lens may not have a prefect circular symmetry, the distortion center denoted by $c_x$ and $c_y$ may not at the geometric center of the image frame.

The $k_1, k_2, \ldots, k_n$ parameters 316 are distortion coefficients that describe the levels of fisheye distortion, as a function of the radius from the center of the captured image frame to the edge of the frame. In some embodiments, n can be, e.g., between 1 and 4, depending on how precise the calibration needs to be and the characteristics of the particular fisheye lens. The $k_1, k_2, \ldots, k_n$ parameters essentially describe how much fisheye distortion an image pixel has as a location of the pixel moves from the center of the image to the edge of the image. In some embodiments, the $k_1, k_2, \ldots, k_n$ parameters are defined radially and do not depend on the circular angle of the pixel location.

There are various reasons why each camera module has its own set of camera intrinsic calibration metadata. In some embodiments, the distance between the left wide-angle lens and the left image sensor may be slightly shorter than the distance between the right wide-angle lens and the right image sensor. Alternatively, due to the manufacturing variance of the wide-angle lenses, the left wide-angle lens may have an optical distortion profile and/or focal length that are different from the optical distortion profile and/or focal length of the right wide-angle lens.

In addition to the camera intrinsic calibration metadata, the camera device is also calibrated to determine stereoscopic calibration metadata 320 for the pair of the two camera modules. The set of stereoscopic calibration metadata 320 describes how a distortion of one fisheye lens is related to a distortion of another fisheye lens. In order words, the set of stereoscopic calibration metadata 320 includes a mapping of distorted coordinates between the two fisheye lenses.

Ideally, the two fisheye lenses of the camera are perfectly aligned next to each other. However, in an actual camera product, any of the two fisheye lenses may be slightly off-center from the perfectly aligned location or its direction may be slightly off the perfectly aligned orientation. The set of stereoscopic calibration metadata can be used to correct the captured images offset the distortion caused by imperfect alignment between those two fisheye lenses. The images are corrected as if they were taken by two fisheye lenses with perfect alignment. The correction of images improves the 3D effect since human eyes are very sensitive to the distortion differences between left and right channels.

In some embodiments, the set of stereoscopic calibration metadata 320 includes a rotation matrix 322 and a projection matrix 324. The rotation matrix 322 describes a rotational correction to align an image captured by one fisheye lens to another image captured by another fisheye lens so that the image planes of the left and right channels are on the same plane. The projection matrix 324 describes a projection operation to ensure that the image frames of the left and right channels are vertically aligned with each other.

In some embodiments, the set of stereoscopic calibration metadata 320 can include compensation metadata that relates to image sensors. For example, the image sensor of the left channel may have slightly different color balance than the image sensor of the right channel. Based on a color calibration test, the camera can store color-mapping metadata as port of the set of stereoscopic calibration metadata to equalize the color balance of the image sensors.

In order to enhance the stereoscopic 3D effect, it is desirable to eliminate the optical distortion difference between the left and right channels of the 3D video due to the manufacturing variances. After the stereoscopic device is manufactured, the device, including the wide-angle lens and the image sensors, can be tested through a calibration process to detect the distortion differences between the left and right channels, represented by the sets of camera intrinsic calibration metadata and the stereoscopic calibration metadata. During the calibration process, the stereoscopic device can capture 3D stereoscopic images and/or videos of several pre-determined test subjects (also referred to as calibration targets), and generate calibration metadata based on the images or videos of the test subjects.

When the stereoscopic device captures images and videos, the calibration metadata are stored within the 3D stereoscopic images or videos in real time. Using those calibration metadata, the captured 3D stereoscopic images or videos can be played back with a compensation based on the calibration metadata.

The calibration metadata are also referred to as a calibration vector. Each element of the calibration vector stores one entry or type of the calibration metadata.

Recalibration for Stereoscopic 3D Calibration Metadata

Although generally the 3D calibration metadata for a particular stereoscopic device does not change after the device is manufactured and calibrated. However, the stereoscopic device may need re-calibration in some situations. For example, if the stereoscopic device is dropped to the ground. The distance between a lens and the image sensor behind the lens may be slightly changed. The stereoscopic device can perform a re-calibration process to re-capture the new 3D calibration metadata.

In some embodiments, the stereoscopic device can re-calibrate itself when the device is capturing a 3D video. Using the content of the 3D video, including the differences between the left and right channels, the stereoscopic device can establish new 3D calibration parameters. For example, a certain object in the video with sharply contrasted portions may act like a contrast-level calibration reference object for the stereoscopic device to conduct the automatic re-calibration. Alternatively, an object in the video may be known as have a rectangular shape, but appears to be curved due to the distortion. The stereoscopic device then can re-calibrate the distortion metadata by detecting the level of distortion on the curved image of the object. The re-calibrated 3D calibration metadata may be transmitted to the playback device in a real time, when the playback device replays the 3D video as the stereoscopic device captures the 3D video.

Embedding Stereoscopic 3D Calibration Metadata

In some embodiments, the 3D calibration metadata can be embedded into the 3D videos as metadata. For example, the stereoscopic device captures the 3D video into a recorded 3D video file and embeds the 3D calibration metadata into the 3D video file as metadata. These metadata can include, e.g., camera intrinsic parameters, parameters of each of the left and right wide-angle lenses, parameters of each of the left and right image sensors, information about the inertial measurement unit (IMU), information about the accelerator, information about the gyroscopic device, information of the device location, etc.

In some embodiments, the 3D calibration metadata can be saved in the metadata header of the 3D video file. Alternatively, the 3D calibration metadata can be saved in a subtitle channel or a closed caption channel in the video file. For example, the 3D calibration metadata can be saved in a foreign language subtitle channel that does not correspond to any real-world language.

In some embodiments, the 3D calibration metadata can be visually encoded into one or more frames of the 3D video file via, e.g., a video steganography process. In some embodiments, a graphic processing unit (GPU) can perform the video steganography process. With the steganography process, the 3D calibration metadata are stored in each frame of the 3D stereoscopic video. Any video playback software or video editing software can extract the 3D calibration metadata since the metadata embedded using steganography does not depends on the video format and always stays with the video frames.

It is desirable to embed the parameters about the camera, sensor, and processing directly into the video file recorded by the stereoscopic camera at the time of capture. Some of those parameters may be fixed for the duration of the video, such as image sensor and calibration parameters; while some parameters may change during the recording process, such as accelerometer, gyroscope, and GPS sensor readings.

In some embodiments, it is desirable that a player can read and process a video file that has been generated using the captured video of different stereoscopic cameras. For example, two users with different stereoscopic cameras may record scenes with their own devices, and then concatenate their respective videos into a single video file. In such a case, the stereoscopic video player will need to be able to associate different portions of the composite video file with different camera parameters, including different lens distortion parameters and image sensor parameters.

Accordingly, there is a need for a system or method that can embed the camera and sensor parameters into the video file captured by a stereoscopic 3D camera. Parameters will be either set once per the entirety of the file, or changed for each frame of the video. Additionally, there is a need for a system or method that can process such a stereoscopic 3D video file and decode the parameters, either fixed for the entirety of the file, or on a per frame basis. Such a system or method could then utilize the parameters during the playback of the video file.

VR Playback Using Stereoscopic 3D Calibration Metadata

During playback of the 3D video file, a playback device (e.g., a stereoscopic device disclosed herein or another device such as a computer, a smart phone, a VR headset or an HMD) can extract the 3D calibration metadata from the 3D video file. For example, the metadata can be, e.g., extracted from the metadata header of the video file, or decoded from one or more frames of the video though a video steganography technique, when the video is being processed by a stereoscopic video player running on the playback device.

A stereoscopic video playback device can run a playback process to render a stereoscopic 3D video, such as a virtual reality ("VR") headset or a mobile phone fitted with a stereoscopic display adapter. In some embodiments, the functionalities and components of the stereoscopic video player can be included in the stereoscopic 3D video camera 100 as well. For example, the camera 100 can include a display screen 160 for playing back the 3D videos, as shown in FIG. 1.

Each of the stereoscopic frames is processed by the player, which may additionally require the parameters associated with the camera that captured the frames. For example, the player may require knowing details about the camera's image sensors and calibration metadata to properly render the stereoscopic frames. If the video frames were processed by the camera prior to being encoded into the video file, the play may also need to know the parameters of the image processing algorithms that processed the frames.

Figure 4:
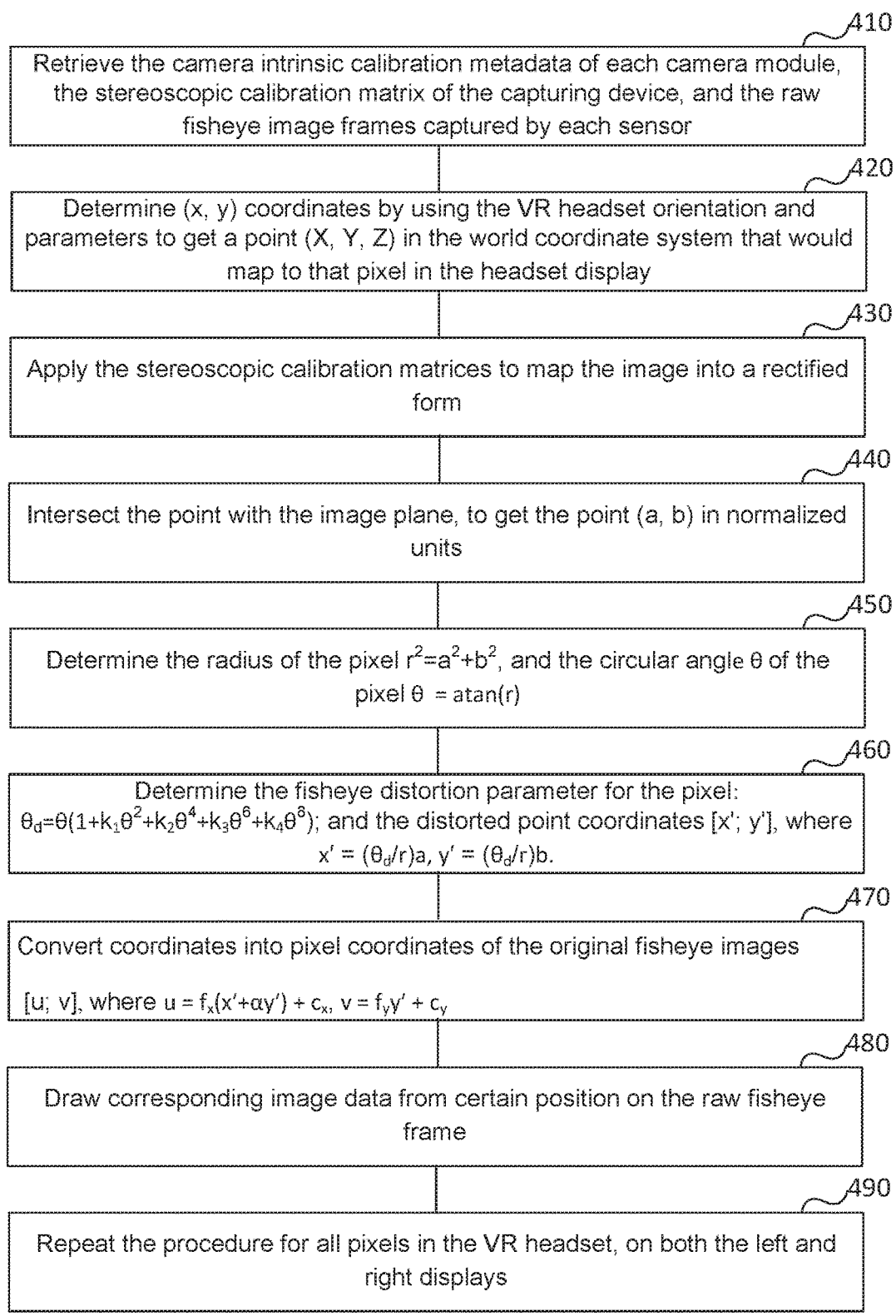
FIG. 4 shows a sample process of playing back a stereoscopic video using embedded calibration metadata.

FIG. 4 shows a sample process of playing back a stereoscopic video using embedded calibration metadata. At block 410, to render a stereoscopic 3D image (or a stereoscopic 3D video frame) onto a VR headset (or other playback device), the playback process retrieves the camera intrinsic calibration metadata of each camera module, the rectification matrices of the capturing device (as stereoscopic calibration metadata), and the raw fisheye image frames captured by each sensor. In addition, the playback process may retrieve some parameters about the headset, such as its current orientation (e.g., represented by an orientation matrix), its field of view, and the offset between the two eye locations of the headset.

Rendering the frame is generally done pixel-by-pixel for each display pixel on the VR headset. In other words, for each pixel to be displayed on the VR headset (also referred to as display pixel), the playback process identifies one or more corresponding pixels from the captured image frames (also referred to as image pixels or frame pixels). The playback process repeats the pixel-by-pixel rendering for both left and right channels.

For each pixel, the playback process can use the headset's current orientation to determine the latitude and longitude of that pixel relative to center of the VR headset (also referred to as a head center location of the VR headset). The orientation can be described using, e.g., an orientation matrix or any equivalent description about the direction.

In some alternative embodiments, the playback process can use a pinhole camera model to intersect the pixel with the image plane, to get the pinhole camera model projected coordinates. The playback process can then use the position coordinates of that pixel to map it into the coordinates of the raw fisheye image. The pixels of the left VR display will be mapped to the left camera module's image (left channel), and the pixels of the right VR display to the right module's captured image (right channel).

For example, assuming (a, b) are the (x, y) coordinates of an original pixel, which are mapped onto the image plane, such that (0, 0) is the center of the image. At block 420, the playback process can determine (x, y) coordinates by using the VR headset orientation and parameters to get a point (X, Y, Z) in the world coordinate system that would map to that pixel in the headset display.

At block 430, the playback process can then apply the rectification matrices to this point, to map the image into a rectified form. In some embodiments, the stereoscopic camera rectification is described by two rectification matrices: a rotation matrix (R) and a projection transform matrix (P). After the rectification using the rectification matrices, the rectified left and right channel frames are in the forms as though the frames were captured from the same image plane. The rotation matrix R is responsible for mapping the image planes of the left and right frames to be on the same plane. The projection matrix P is used to ensure that the left and right images are vertically aligned, and satisfy an epipolar geometry. In some embodiments, the left and right frames can be assigned their own rotation and projection matrices, R1, P1, and R2, P2, respectively, such that when applied the frames will be rectified to a common image plane that is halfway between the left and right planes. Coordinates from the unrectified left frame, for example, can be mapped to the rectified plane by pre-multiplying the coordinate by R*P. Similarly, the inverse of R*P can be used to map points from the rectified frame to an unrectified frame.

In some embodiments, the rectification process may be defined by a rotation matrix and a translation matrix. These matrices describe how to rotate and then translate one image frame to line it up with the other's plane. Algorithms, such as Bouguet's algorithm, can be used to convert the rotation and translation matrices into a rotation and projection matrix. Bouguet's algorithm, for example, is used to compute R and P while minimizing reprojection distortions, while maximizing the common viewing area between the left and right frames.

At block 440, the playback process can then intersect the point with the image plane, to get the point (a, b) in normalized units. At block 450, the playback process determines the radius of the pixel which can be defined by the equation: $r^2 = a^2 + b^2$; and the circular angle $\theta$ of the pixel which can be defined as: $\theta = a\tan(r)$.

At block 460, the playback process determines the fisheye distortion parameter for the pixel: $\theta_d = \theta(1 + k_1\theta^2 + k_2\theta^4 + k_3\theta^6 + k_4\theta^8)$; and the distorted point coordinates [x'; y'] where $x' = (\theta_d/r)a$, $y' = (\theta_d/r)b$.

At block 470, the playback process then can convert those coordinates into pixel coordinates of the original fisheye images. The final pixel coordinates are vector [u; v], where:

$$u = f_x(x' + \alpha y) + c_x$$

$$v = f_y y' + c_y$$

At block 480, with those final pixel coordinates, the playback process can draw corresponding image data from certain position on the raw fisheye frame. The [u, v] coordinates need not be integers. The playback process can use interpolation in the source fisheye image if the [u,v] coordinates are not integers. With those coordinates, the playback process pulls the [u, v] pixel from the fisheye image, and displays that pixel value on the VR headset at the original pixel point that is being rendered. At block 490, the playback process repeats this procedure for all pixels in the VR headset, on both the left and right displays. In addition, the playback process can update the pixels at the refresh rate of the headset. In some embodiments, the playback process can be performed efficiently by a graphics processing unit (GPU), though it could also be done on a central processing unit (CPU).

Stereoscopic 3D 360-Degree Stitching

In some embodiments, multiple stereoscopic devices can be combined together to capture the 3D image or 3D video in a super wide field of view (e.g., 360 degrees) simultaneously. Each stereoscopic device can capture the 3D image or 3D video at a wide field of view (e.g., 180 degrees) for both left and right channels.

Those simultaneously captured 3D videos can be combined together to create a virtual reality experience in 360 degrees. The combining process is also referred to as stitching. To maintain the stereoscopic effect, the left eye images captured by different devices (for a particular frame) can be stitched together, and the right eye images can be stitched together. The two stitched images can be used to regenerate the stereoscopic effect in 360 degrees.

Thus, multiple sets of 3D calibration metadata need to be embedded into the combined 3D videos. Each set of the 3D calibration metadata corresponds to a channel of a 3D video captured by a pair of a wide-angle lens and an image sensor within a stereoscopic device.

Figure 5:
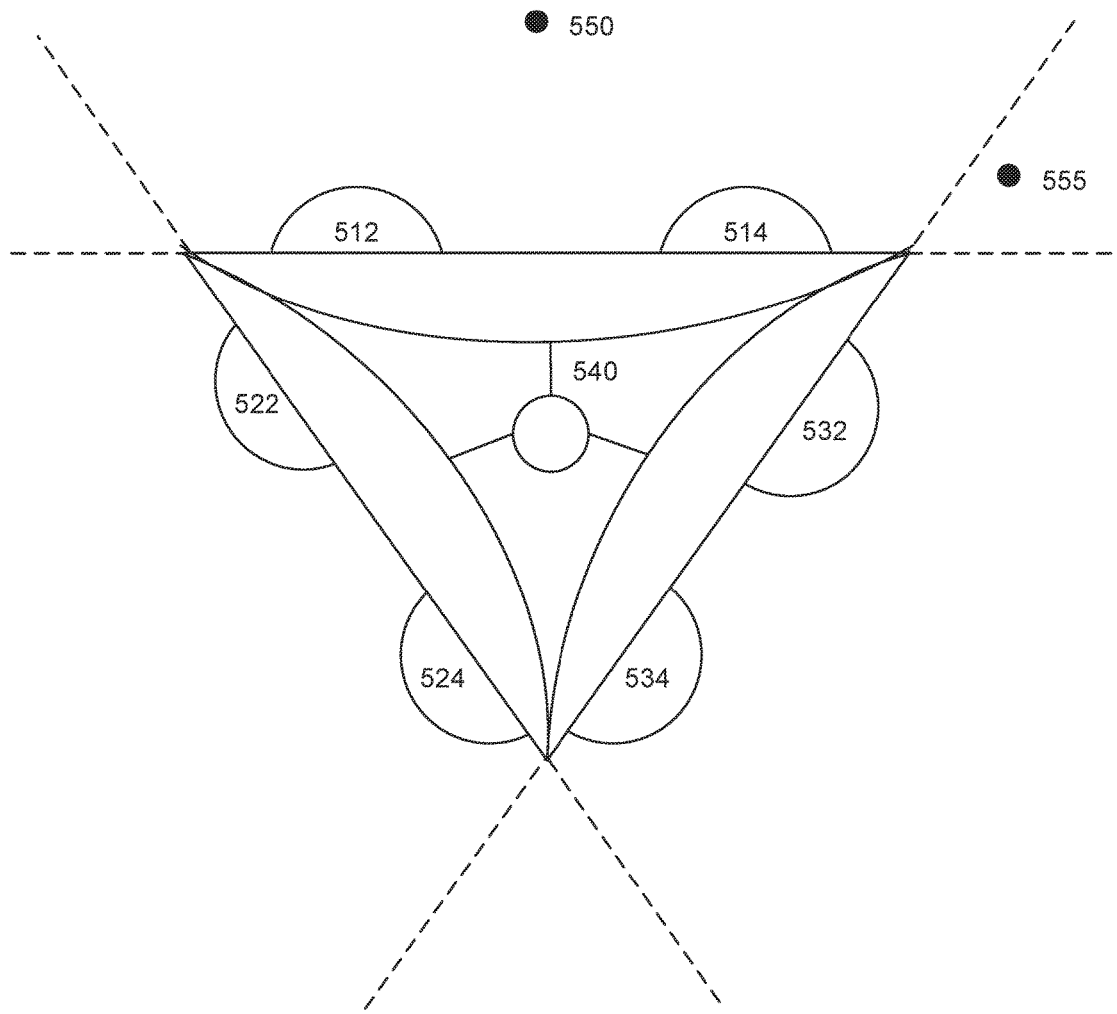
FIG. 5 shows multiple stereoscopic devices for capturing 3D videos from different directions simultaneously.

FIG. 5 shows multiple stereoscopic devices for capturing 3D videos from different directions simultaneously. Each of the stereoscopic devices 510, 520, 530 has a field of view of, e.g., 180 degrees. By combining the 3D videos captured by the three devices (totally 6 channels), a virtual reality of 360 degrees can be recreated.

During video capturing, three stereoscopic devices 510, 520, 530 can be mounted on a 360 rig mount 540 such the three stereoscopic devices 510, 520, 530 are facing three different directions. The 3D images or 3D videos captured by the lenses 512, 514, 522, 524, 532, 534 of the stereoscopic devices 510, 520, 530 can be stitched together to create a 360-degree virtual reality experience. For example, when a user moves the head at any orientation with the 360 degrees, the device in real time plays back a cropped portion of the 360-degree stitched 3D videos based on the head orientation and human vision field of view. Therefore, the user can experience a sense of presence in a 360-degree virtual environment based on the 360-degree 3D image or 3D video captured simultaneously by the three stereoscopic devices.

During the playback, depending on the orientation of the user head, the playback device might use multiple channels from one or more stereoscopic device to general in real time the left and right playback videos. Thus, the playback device switches in real time between different sets of 3D calibration metadata, depending on the channels it currently uses for generating the playback videos. In some embodiments, the calibration using the 3D calibration metadata is performed on a frame-by-frame basis. Therefore, the 3D calibration metadata needs to be extracted in a real time in order to switch between the sets of 3D calibration metadata in real time.

For example, at a first time point during the playback of the combined 3D videos, the user head is pointing toward a direction corresponding to the point 350 as illustrated in FIG. 5. The playback device determines that at the first time point, only the left and right channels of the 3D video captured by the device 510 is need in order to achieve the binocular stereoscopic effect and play back the current 3D VR videos for the eyes of the user. In other words, the device needs the 3D calibration metadata that relate to the device 510, including the lenses 512 and 514.

At a second time point during the playback of the combined 3D videos, the user head is pointing toward a direction corresponding to the point 555 as illustrated in FIG. 5. This time, the playback device determines that at the second time point, the device needs the right channel of the 3D video captured by the device 510 and the left channel of the 3D video captured by the device 530, in order to play back the current 3D VR videos for both eyes of user. In other words, the playback device leverages different reference points (with different perspectives) from lenses from different stereoscopic devices to achieve the binocular stereoscopic effect.

Thus, at the second time point, the device needs the 3D calibration metadata that relate to the device 510 (including the lens 514), as well as the 3D calibration metadata that relate to the device 530 (including the lens 532). Therefore, the playback device needs to switch between different sets of 3D calibration metadata in real time, depending on the 3D video channels on which the device currently relies for playing back the 3D VR video for the user.

The 3D effect at the point 555 might be less than the 3D effect at the point 50, because of the different perspectives of lenses and the fields of view. However, generally human eyes do not notice the diminishing 3D effect. This is because human eyes themselves have less 3D perception for the peripheral visions. Therefore, humans are used to the facts that areas of peripheral visions generally have less stereoscopic 3D effects.

Although FIG. 5 shows three devices, the technology can be applied to an arbitrary number of stereoscopic devices. For example, two stereoscopic devices with 180 degrees can be used to recreate a 360-degree virtual reality experience, using the technology disclosed herein.

Although FIG. 5 shows multiple devices for recording a combined 3D video for a field of view of 360 degrees, in some embodiments, the 3D effect of a field of view of 360 degrees can be achieved by a panoramic scan using a stereoscopic device. For example, a user can use the stereoscopic device to capture a continuous sequence of stereoscopic 3D images by a panoramic scanning motion. By stitching the continuous sequences of stereoscopic 3D images together, a playback device can recreate a 3D image with a field of view of 360 degrees.

In order to stitch the images or video frames captured by different camera modules (including lenses and image sensors) of different capturing devices (e.g., 3D cameras), the 360 stitching process needs to process the calibration metadata of different camera modules and cameras. Each camera module has its unique set of camera intrinsic calibration metadata. In addition, each stereoscopic pair of lenses from a capturing device has its own stereoscopic calibration metadata. The 360 stitching process uses those metadata to avoid distortions that are caused by the hardware variances of the lenses and capturing devices.

The 360 stitching process can first re-project each 180-degree stereo pair into a particular form, such as an equirectangular projection format. An equirectangular projection maps a sphere onto a rectangular image, such that the y coordinate is the latitude, and the x coordinate is the longitude, multiplied by a constant.

A 180-degree FOV image will only cover a portion of the recording sphere (half of it). When the image is converted to an equirectangular format, the equirectangular form of the 180-degree FOV image fills a portion of the recording sphere. Once all of the images from each sensor for a particular eye channel (left or right) have been converted to an equirectangular format (or other projection format, as desired), those images in the equirectangular format can be stitched together using image or video stitching algorithm as a 360-degree recording sphere image for left or right eye channel.

The procedure described in the previous VR playback section can be used for reprojection. For each pixel in the destination projection, the process can determine the latitude and longitude coordinates of the pixel based on the (x, y) coordinates of the image. The process can then apply the stereoscopic calibration and then camera intrinsic calibration, to map the point of the pixel onto the source fisheye image. Thus, the process can reproject the original fisheye image into a different format, such as an equirectangular projection. This process applies the calibration metadata, and converts the images into a standard projection. After the process, the calibration information is no longer needed for stitching. The 360 stitching can then be done on those standard projected images. Even though each original camera module had its own unique calibration settings, by reprojecting using the calibration metadata and then stitching, the images can now be stitched together without further calibration.

Sample Hardware Architecture

Figure 6:
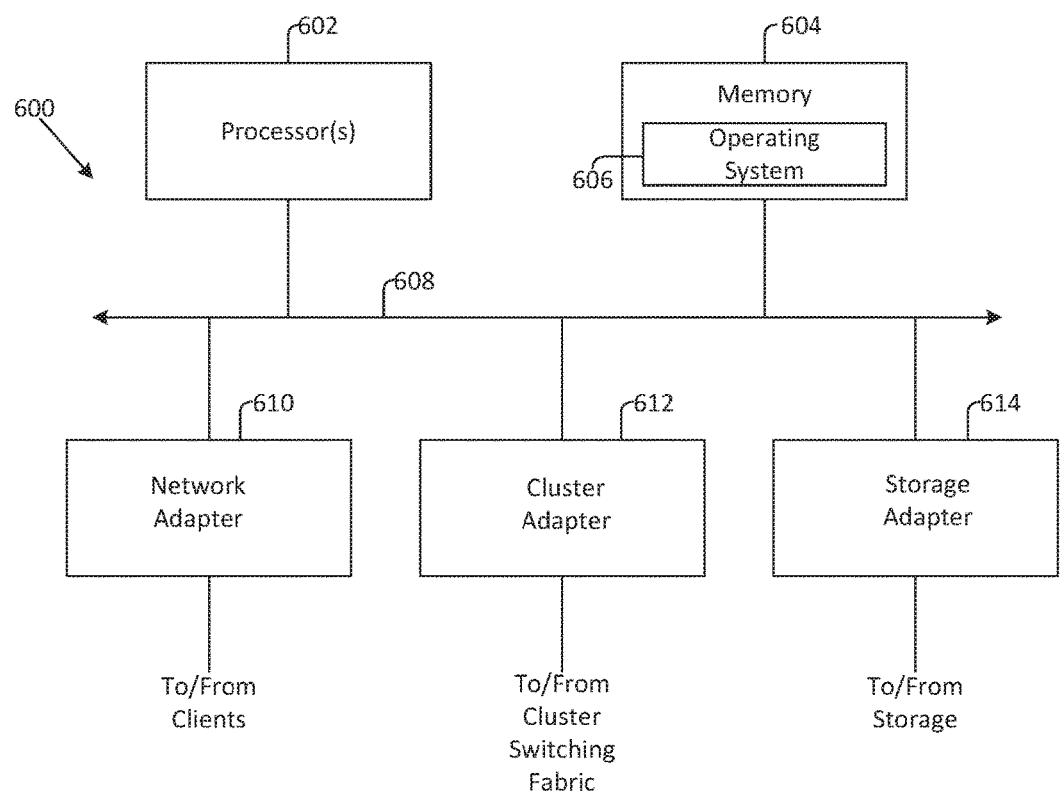
FIG. 6 is a high-level block diagram illustrating an example of a hardware architecture of a computing device that performs disclosed functionalities, in various embodiments.

FIG. 6 is a high-level block diagram illustrating an example of a hardware architecture of a computing device 600 that performs the above process, in various embodiments. The computing device 600 executes some or all of the processor executable process steps that are described below in detail. In various embodiments, the computing device 600 includes a processor subsystem that includes one or more processors 602. Processor 602 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 600 can further include a memory 604, a network adapter 610, a cluster access adapter 612 and a storage adapter 614, all interconnected by an interconnect 608. Interconnect 608 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (I9E) standard 1394 bus (sometimes referred to as "Firewire") or any other data communication system.

The cluster access adapter 612 includes one or more ports adapted to couple the computing device 600 to other devices. In the illustrated embodiment, Ethernet can be used as the clustering protocol and interconnect media, although other types of protocols and interconnects may be utilized within the cluster architecture described herein.

The computing device 600 can be embodied as a single- or multi-processor system executing an operating system 606 that can implement a high-level module, e.g., a manager, to logically organize the information as a hierarchical structure of named directories, files and special types of files called virtual disks at the storage devices. The computing device 600 can further include graphical processing unit(s) for graphical processing tasks or processing non-graphical tasks in parallel.

The memory 604 can comprise storage locations that are addressable by the processor(s) 602 and adapters 610, 612, and 614 for storing processor executable code and data structures. The processor 602 and adapters 610, 612, and 614 may, in turn, comprise processing elements and/or logic circuitry configured to execute the software code and manipulate the data structures. The operating system 606, portions of which are typically resident in memory and executed by the processor(s) 602, functionally organizes the computing device 600 by (among other things) configuring the processor(s) 602 to invoke. It will be apparent to those skilled in the art that other processing and memory implementations, including various computer readable storage media, may be used for storing and executing program instructions pertaining to the technology.

The network adapter 610 can include multiple ports to couple the computing device 600 to one or more clients over point-to-point links, wide area networks, virtual private networks implemented over a public network (e.g., the Internet) or a shared local area network. The network adapter 610 thus can include the mechanical, electrical and signaling circuitry needed to connect the computing device 600 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 614 can cooperate with the operating system 606 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 614 can include multiple ports having input/output (I/O) interface circuitry that couples to the disks over an I/O interconnect arrangement, e.g., a conventional high-performance, Fibre Channel (FC) link topology. In various embodiments, the cluster adapter 612 and the storage adapter 614 can be implemented as one adapter configured to connect to a switching fabric, e.g., a storage network switch, in order to communicate with other devices and the mass storage devices.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for rendering a stereoscopic video sequence using calibration metadata, comprising: receiving, by a processor, the stereoscopic video sequence including a sequence of stereoscopic images by a stereoscopic video playback device; extracting, by a processor, calibration information from the stereoscopic video sequence, the calibration information comprising a distortion center of a lens wherein the distortion center is different from a geometric image center when the lens lacks circular symmetry, and a distortion coefficient of the lens comprising a function of a radius from a center of a stereoscopic image in the sequence of stereoscopic images to an edge of the stereoscopic image; for each display pixel of the stereoscopic video playback device, identifying a corresponding image pixel of the stereoscopic video sequence using the calibration information, by determining a fisheye distortion parameter for a pixel comprising $\theta_d$ equals $\theta(1+k_1\theta^2+k_2\theta^4+k_3\theta^6+k_4\theta^8)$, and determining a distorted point coordinates x' and y', wherein x' equals $(\theta_d/r)a$, and y' equals $(\theta_d/r)b$; and rendering, by a processor, a stereoscopic video on a stereoscopic display of the stereoscopic video playback device by projecting contents of corresponding image pixels of the stereoscopic video sequence to the display pixels of the stereoscopic video playback device.

2. The method of claim 1, wherein the step of extracting comprises:
   extracting calibration information from a metadata header of a stereoscopic video file containing the stereoscopic video sequence.

3. The method of claim 1, wherein the step of extracting comprises:
   extracting calibration information from a subtitle channel or a closed caption channel of a stereoscopic video file containing the stereoscopic video sequence.

4. The method of claim 1, wherein the step of extracting comprises:
   decoding calibration information via an image steganography process from at least some of the stereoscopic images of the stereoscopic video sequence.

5. The method of claim 4, wherein the decoding of the calibration information via the image steganography process is performed by a graphics processing unit (GPU) of the stereoscopic video playback device.

6. The method of claim 1, wherein the stereoscopic video playback device includes a stereoscopic display component for rendering left and right channels of the stereoscopic video separately.

7. The method of claim 1, wherein the stereoscopic video sequence is captured by a plurality of wide-angle lenses of a stereoscopic recording device, and wherein for each wide-angle lens, the calibration information includes a plurality of focal lengths of a the wide-angle lens, the focal lengths measures ability of the wide-angle lens to bend light at different directions.

8. The method of claim 1, wherein the stereoscopic video sequence is captured by a plurality of wide-angle lenses of a stereoscopic recording device, and wherein for each wide-angle lens, the calibration information includes coordinates of a distortion center of images captured by the wide-angle lens.

9. The method of claim 1, wherein the stereoscopic video sequence is captured by a plurality of wide-angle lenses of a stereoscopic recording device, and wherein for each wide-angle lens, the calibration information includes a plurality of distortion coefficients that describe levels of fisheye distortion as the function of a radius from a center of a captured image to an edge of the captured image.

10. The method of claim 1, wherein the calibration information includes a rotation matrix that describes a rotational relationship between images of a left channel of the stereoscopic video sequence and images of a right channel of the stereoscopic video sequence, and a projection matrix vertically aligning the images of the left channel with the images of the right channel.

11. A method for generating a virtual reality (VR) using 360-degree stereoscopic videos, comprising: receiving, by a processor, a plurality of stereoscopic video sequences, each of the stereoscopic video sequences including a wide-angle left channel video and a wide-angle right channel video;

extracting, by a processor, calibration information from the stereoscopic video sequences, the calibration information comprising a distortion center of a lens wherein the distortion center is different from a geometric image center when the lens lacks circular symmetry, and a distortion coefficient of the lens comprising a function of a radius from a center of a stereoscopic image in the sequence of stereoscopic images to an edge of the stereoscopic image; applying, by a processor, the calibration information to frames of the stereoscopic video sequences to correct distortion caused by capturing devices of the stereoscopic video sequences, by determining a fisheye distortion parameter for a pixel comprising $\theta_d$ equals $\theta(1+k_1\theta^2+k_26^4+k_3\theta^6+k_4\theta^8)$, and determining a distorted point coordinates x' and v', wherein x' equals $(\theta_d/r)a$, and y' equals $(\theta_d/r)b$; projecting, by a processor, frames of the stereoscopic video sequences from spherical forms to rectangular forms; and stitching, by a processor, frames from wide-angle left channel videos into 360-degree frames of a left channel of a 360-degree VR stereoscopic video, and stitching frames from wide-angle right channel videos into 360-degree frames of a right channel of the 360-degree VR stereoscopic video.

12. The method of claim 11, wherein the step of projecting comprises:
   projecting frames of the stereoscopic video sequences using equirectangular projection to generate frames of a rectangular form.

13. The method of claim 11, wherein the calibration information is stored in a metadata header, a subtitle channel, or a closed caption channel of stereoscopic files containing the stereoscopic video sequences.

14. The method of claim 11, wherein the calibration information for each capturing device capturing a particular stereoscopic video sequence is embedded in frames of the particular stereoscopic video sequence using a steganography process.

15. The method of claim 11, wherein the calibration information for each capturing device capturing a particular stereoscopic video sequence includes focal lengths of lenses of the capturing device, coordinates of distortion centers of images captured by the lenses of the capturing device, or distortion coefficients that describe levels of fisheye distortion as function of a radius from a center of images captured by the lenses of the capturing device to an edge of the captured images.

16. The method of claim 11, wherein the calibration information for each capturing device capturing a particular stereoscopic video sequence includes a rotation matrix that describes a rotational relationship between images of a left channel of the particular stereoscopic video sequence and images of a right channel of the particular stereoscopic video sequence, and a projection matrix vertically aligning the images of the left channel with the images of the right channel.

17. A method to identify a mapping between a display pixel of a stereoscopic video playback device, and a corresponding image pixel of a stereoscopic video sequence, the method comprising: retrieving, by a processor, a distortion coefficient of a lens, a focal length of the lens, a distortion center parameter of the lens, a stereoscopic calibration matrix of a capturing device, and a raw fisheye image captured by the lens; given the display pixel in the stereoscopic video playback device, determining, by a processor, a point in the world coordinate system that maps to the display pixel in the stereoscopic video playback device by using an orientation and parameters of the stereoscopic video playback device; applying, by a processor, the stereoscopic calibration matrix to map the raw fisheye image into a rectified image; intersecting, by a processor, a line from the lens to the point in the world coordinate system with the rectified image to obtain a second pixel coordinates in normalized units; based on the second pixel coordinates in normalized units, determining, by a processor, a radius and a circular angle of the second pixel; based on the distortion coefficient of the lens, the radius of the second pixel and the circular angle of the second pixel, determining, by a processor, a distorted coordinate by determining a fisheye distortion parameter for a pixel comprising $\theta_d$ equals $\theta_d(1+k_1\theta^2+k_2\theta^4+k_3\theta^6+k_4\theta^8)$, and determining the distorted coordinates x' and y', wherein x' equals $(\theta_d/r)a$, and y' equals $(\theta_d/r)b$; and based on the focal length of the lens, and the distortion center parameter of the lens, converting, by a processor, the distorted coordinate into the corresponding image pixel of the stereoscopic video sequence.

* * * * *